April 8, 1941.                M. BIRKIGT                 2,237,583
                             MACHINE TOOL
                         Filed Dec. 23, 1938          5 Sheets-Sheet 1
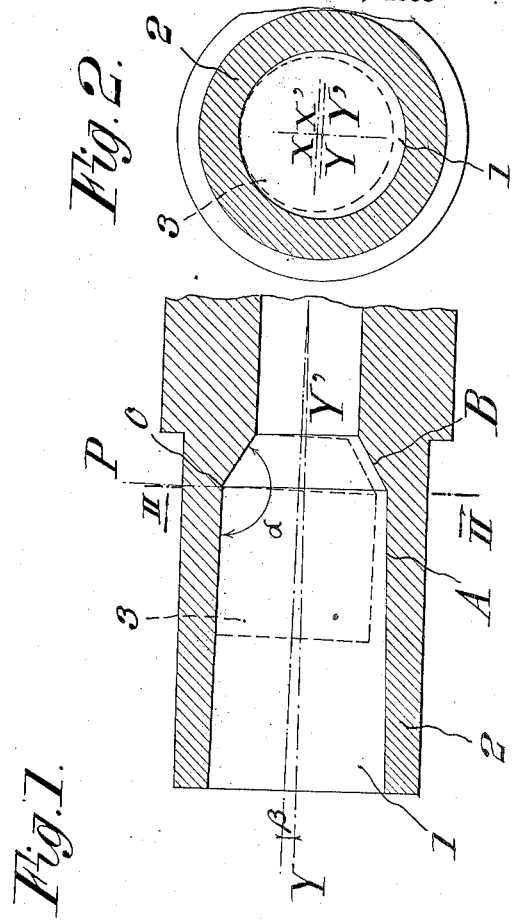
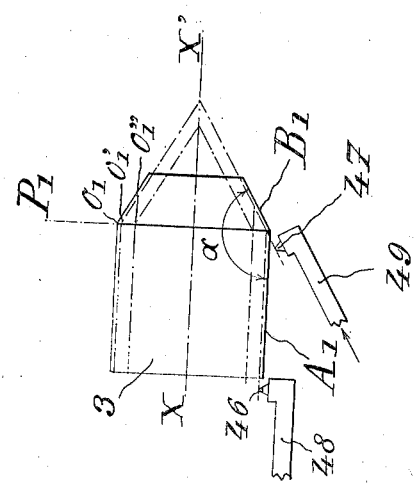
Inventor:
Marc Birkigt,
Attorneys

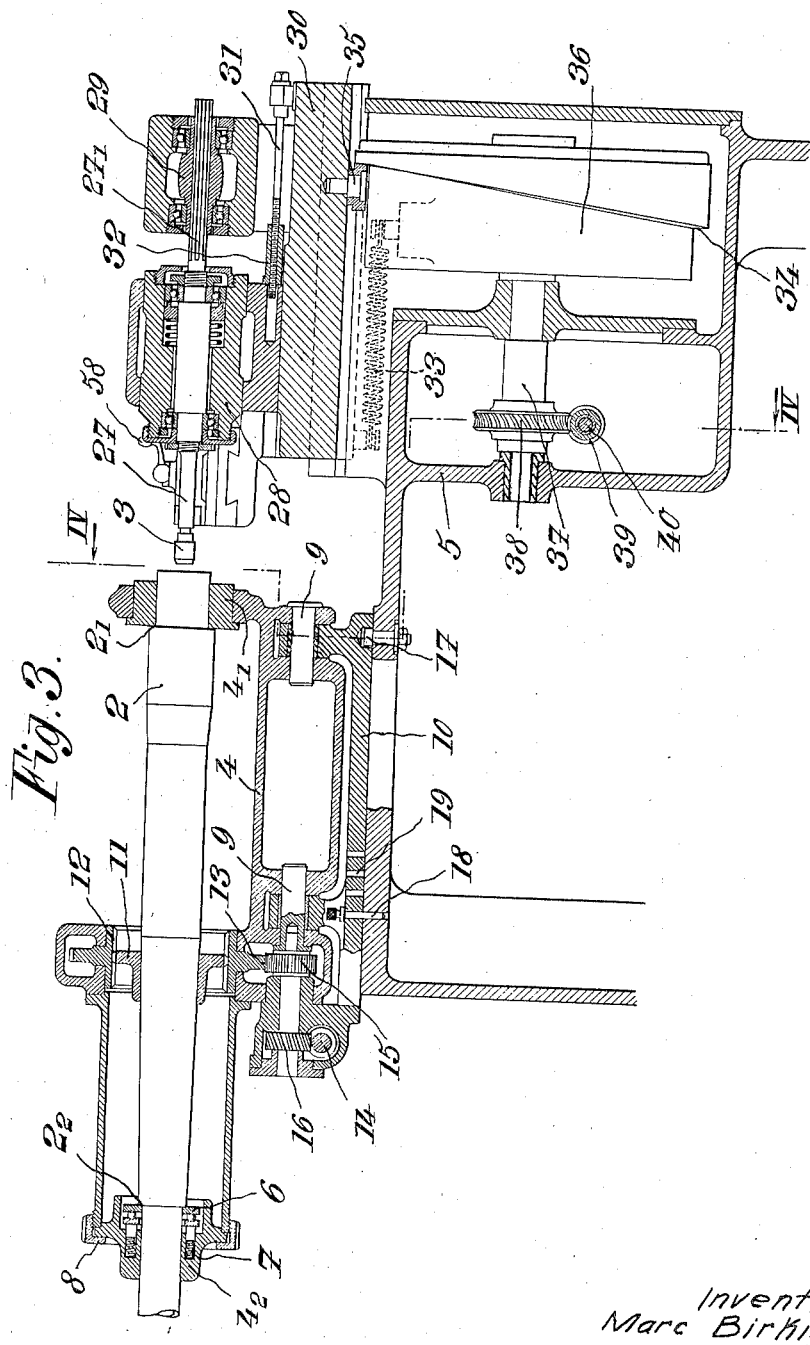

April 8, 1941.    M. BIRKIGT    2,237,583
MACHINE TOOL
Filed Dec. 28, 1938    5 Sheets-Sheet 3
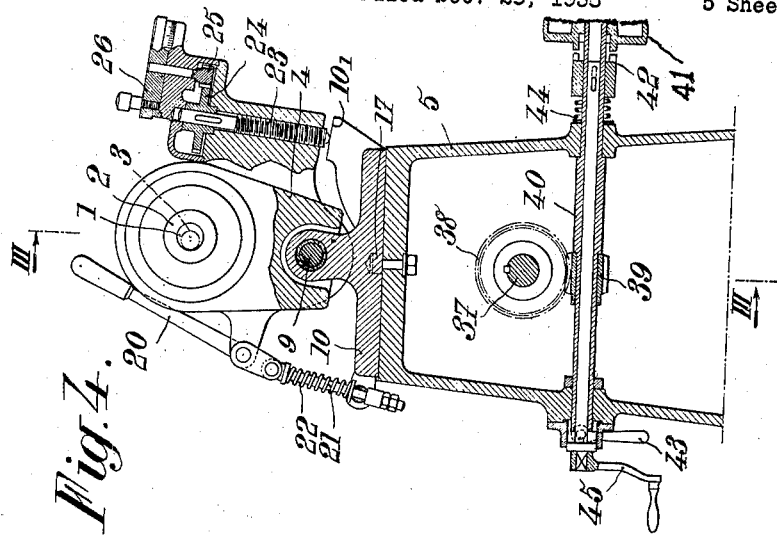
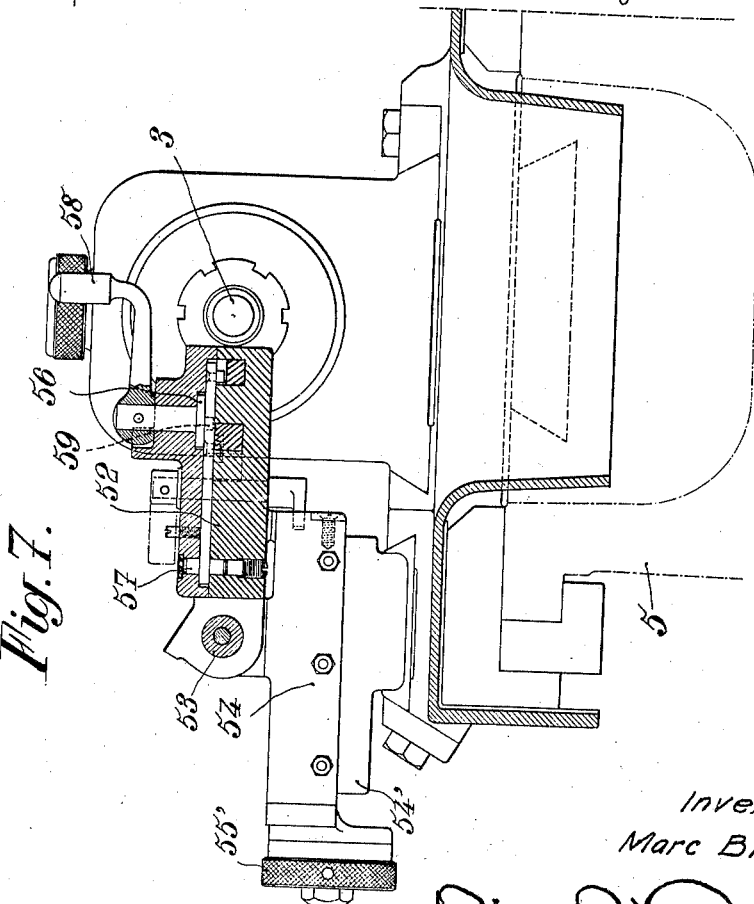
Inventor:
Marc Birkigt,
Bailey & Carson
Attorneys

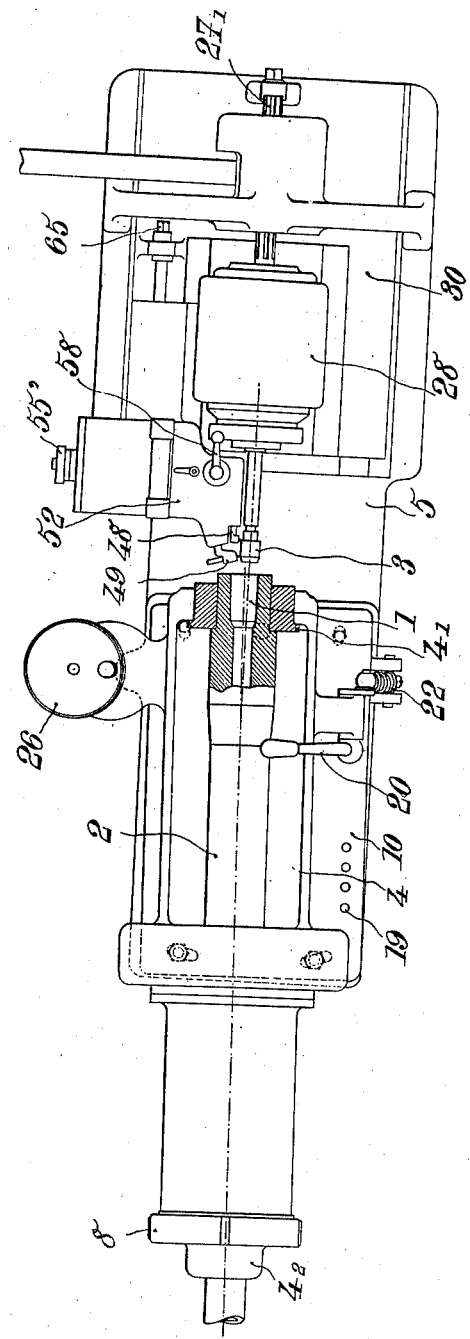

April 8, 1941.                M. BIRKIGT                2,237,583
                              MACHINE TOOL
                         Filed Dec. 23, 1938          5 Sheets-Sheet 5

Fig. 6.

Inventor:
Marc Birkigt,

Bailey & Carson
Attorneys

Patented Apr. 8, 1941

2,237,583

UNITED STATES PATENT OFFICE 2,237,583

MACHINE TOOL

Marc Birkigt, Versoix, near Geneva, Switzerland

Application December 28, 1938, Serial No. 248,136
In France August 17, 1938

7 Claims. (Cl. 51—50)

The present invention relates to devices for rectifying, by means of a grinding wheel, surfaces which are to have a predetermined profile, for instance, the walls of nozzles, or surfaces constituted by the jointing of cone frustums having different apexes. The invention is more especially, although not exclusively, concerned, among these devices, with those serving to rectify the cartridge chambers of guns, and especially automatic guns of small bore.

The chief object of the present invention is to provide a device of the type above described which is better adapted to meet the requirements of practice than devices used for the same purpose up to the present time.

According to an essential feature of the present invention, I provide, for coacting with the surface to be rectified, a grinding wheel of suitable profile, the relative forward movement of which in the direction of its axis is controlled in such manner that, for a given adjustment, said wheel always reaches the same extreme position with respect to said surface, and I associate this system with means for dressing the wheel such that, once the wheel has been treated by said means, it has been given back its original axial section by removal of matter in a direction perpendicular to the axis of the wheel.

Other features of the present invention will result from the following detailed description of some specific embodiments thereof.

Preferred embodiments of the present invention will be hereinafter described, with reference to the accompanying drawings, given merely by way of example, and in which:

Fig. 1 is a diagram showing, in axial section, a device according to the invention, for rectifying the cartridge chamber of a gun;

Fig. 2 is a section on the line II—II of Fig. 1;

Fig. 3 is a longitudinal section on the line III—III of Fig. 4, of a machine according to the present invention;

Fig. 4 is a sectional view on the line IV—IV of Fig. 3;

Fig. 5 is a plan view, with parts cut away, of the same machine;

Fig. 6 is a plan view, on an enlarged scale of a dressing device for the grinding wheel, to be used in connection with said machine;

Fig. 7 is a side view, with parts in section, corresponding to Fig. 6.

The device which will now be described with reference to the appended drawings is more especially intended for rectifying the walls of a cartridge chamber 1 of a gun 2 (for instance a small bore automatic gun), said walls being constituted by frusto-conical surfaces A and B, of different angles, jointed together in a plane P.

In order to obtain a tight fitting of the shell cartridge in its housing (a condition which is necessary when firing at high speeds), the walls of chamber 1 must be machined with a high accuracy and in particular the angle $\alpha$ between the generatrices of surfaces A and B must be exactly of the desired value.

In order to obtain this result, rectification operations are performed inside chamber 1 by means of a grinding wheel 3 which is brought into inward tangential contact, that is to say in contact along a line, with the surfaces to be rectified, the gun being given a rotary movement in such manner that all the generatrices of surfaces A and B of said chamber 1 are successively touched by grinding wheel 3.

This grinding wheel is made of two portions, two such wheel elements being, for instance, a cylindrical part $A_1$ and a frusto-conical portion $B_1$, the respective generatrices of said portions located in the same axial plane making with each other an angle equal to $\alpha$.

Furthermore, the axis XX' of the grinding wheel (parallelly to which the rectification operations are performed) and the axis YY' of the gun make with each other an angle $\beta$ equal to one half of the angle of conical surface A, so that grinding wheel 3 may remain tangent to said surface A through its portion $A_1$, during the whole of the time of a rectification operation.

According to the chief feature of the invention, the machine which is to permit of producing the desired relative displacements of grinding wheel 3 with respect to gun 2 (which displacements will be hereinafter supposed, by way of example, to be obtained by a forward movement of the wheel carrier with respect to the gun support) is arranged in such manner as to comply with the following conditions:

On the one hand, for a given adjustment of the machine, the forward stroke of grinding wheel 3 must be constant and such that, at the end of the stroke of said wheel the portion $B_1$ of the wheel is tangent to surface B, that is to say that the point of intersection $O_1$ of the working generatrices of surfaces $A_1$ and $B_1$ of the grinding wheel coincides with the point of intersection O of the contacting generatrices of the surfaces A and B of cartridge chamber 1;

On the other hand, said machine is fitted with means for dressing the wheel 3 in such manner that once it is removed from the piece of work it can be given back its original profile by removal of matter advantageously in a direction perpendicular to the axis of said wheel.

It will be readily understood that, with such an arrangement, it is possible, while frequently dressing wheel 3, to perform a great number of successive rectification operations without having to modify the adjustment of the machine as far as the forward stroke of said wheel is concerned.

This is due to the fact that the dressing of wheel 3 in such manner as to remove matter in a direction at right angles to the axis of the wheel does not modify the position of the plane along which surfaces $A_1$ and $B_1$ intersect each other (successive sections of these surfaces have been shown in dotted lines in Fig. 1) said operations merely bringing point $O_1$ closer to axis $XX'$ (positions shown at $O'_1$ and $O''_1$ for the sections after dressing shown by the drawings). Furthermore, after dressing, the new surfaces of wheel 3 still make the same angle $\alpha$ with each other.

Therefore, it will be possible, by displacing said wheel in such manner that plane $P_1$ slides upon itself, to bring back one of the points $O'_1$ or $O''_1$ into coincidence with point $O_1$, that is to say to re-establish the working profile of the grinding wheel exactly in the position it occupied initially. As the forward stroke of the wheel has not changed, it is therefore possible to perform, after dressing of the wheel, a rectification operation identical to the preceding one.

Practically, the wheel is given a complementary relative displacement so that it again attacks, if this is necessary, walls A and B, but at the end of the new rectification operation, point $O_1$ (with which coincide points $O'_1$ or $O''_1$) comes to coincide with point O, of intersection of the rectified generatrices, as in the course of the preceding operation, and the angle $\alpha$ between surfaces A and B is not modified.

Thus, it will be possible to alternate the operations of rectification of chamber 1 and of dressing of wheel 3 until said wheel is wholly worn.

It should be noted that the use of such rectification means necessitates the use of a checking system which enables the operator to ascertain whether wheel 3 is indeed of the desired profile and whether chamber 1 is of the desired shape and size.

Advantageously, according to the present invention, such a checking system includes the following elements:

On the one hand, a frusto-conical plug having exactly the shape and size of chamber 1 and provided with a mark which permits of driving it to the desired depth, said plug being intended to be engaged from time to time into the cartridge chamber which is being rectified.

On the other hand, a gun identical to the guns to be machined (which will be hereinafter called "false gun"), a sector, for instance of 90°, being cut away from this false gun at the place of the cartridge chamber, whereby the latter is made visible from the outside and the operator can ascertain whether the grinding wheel employed for rectification is of the desired shape and size, that is to say whether its surface bears correctly against the surfaces of said cartridge chamber.

The checking operations to be performed are then the following:

Before fitting a grinding wheel on the machine, the operator checks it on the false gun, so as to make sure that it is of the desired profile. If this is not the case, he dresses said wheel as above explained until the broken line corresponding to the axial section of said wheel can come to be applied, over its whole length, against the wall of the cartridge chamber of said false gun. Then the operator performs a first rectification operation, after which he again checks the size and shape of the cartridge chamber, by means of the checking plug. If necessary (that is to say if the mark carried by the plug does not coincide with a mark carried by the gun) a new rectification operation is performed, after having, if necessary, dressed the wheel and checked its axial section after this dressing operation. These operations are repeated until the operator finds, by means of the plug, that the cartridge chamber is of the desired shape and size.

Although it is possible, in accordance with the principles above set forth concerning rectification, to provide many specific mechanisms for carrying out the invention, I have found that it is particularly advantageous to operate as follows:

Concerning first the machine as a whole, with the exception of the dressing system to be provided for the rectifying wheel, it is made in such manner that the support 4 of the gun 2 can have the following displacements with respect to the frame 5 of the machine:

(a) On the one hand a pivoting movement which permits of bringing the axis of the gun to be treated to make the desired angle $\alpha$ with the axis of the grinding wheel;

(b) On the other hand, a rocking movement which permits of quickly clearing the field of action of the wheel, with a view to performing the checking operations by means of the plug. This rocking movement is limited by a micrometric abutment, adjustable in position, as it will be more explicitly described in what follows, and it permits of bringing the gun, after each rectification operation, into a position in which chamber 1 is attacked, to the desired degree, by grinding wheel 3, in the course of the next operation.

For this purpose, I will advantageously employ the embodiment illustrated by the drawings and which will now be described in detail.

Concerning first support 4, it is made in such manner that gun 2 can revolve freely in bearings $4_1$ and $4_2$, and furthermore that said gun always occupies the same axial position with respect to said support. For this purpose, for instance, gun 2 bears, on the one hand, through a shoulder $2_1$ located on the side of wheel 3, against bearing $4_1$, and, on the other hand, through a shoulder $2_2$, against a ball bearing 6 elastically maintained by a spring 7 which bears itself against a cover 8 and tends to apply shoulder $2_1$ against bearing $4_1$.

This support is journalled, about axes or journals 9, on a plate 10, so that it can be swung out of the path of travel of grinding wheel 3.

In order to rotate gun 2, I provide a driving system which may include, for instance, a toothed pinion 11 adapted to be forced upon a conical part of said gun, this pinion being adapted to rotate together with a ribbed sleeve 12 journalled on support 4 and the periphery of which carries a pinion 13 driven by a driving shaft 14 through a pinion 15 and a helical pinion 16 both mounted coaxially with the journals 9 of support 4.

Plate 10 is pivotally mounted about a shaft or axis 17 carried by the machine frame, so as to permit of positioning the axis of gun 2 and the axis of wheel 3 in such relative positions that they make with each other the angle $\beta$ corresponding to the type of cartridge to be used in gun 2. Advantageously, marking means, such for instance as a spindle 18 capable of extending through plate 10, owing to the provision of orifices 19, and of engaging in corresponding orifices provided in the upper part of frame 5, are provided for locking said plate 10, with respect to said frame, in positions corresponding to various values of angle $\beta$, that is to say to the rectification of cartridge chambers intended to receive different types of cartridges.

In order to enable the operator to work the whole, that is to say to rock support 4 about journals 9, I provide a control system, which is preferably chosen of the snap action type in such manner that once the structure has been moved away from its active position, the support remains in its new position, said control system being for instance constituted by a lever 20 pivoted on a boss of support 4 and connected through a connecting rod 21 with plate 10, a spring 22 being provided which constantly tends to close the angle made by said lever with said connecting rod.

Finally, in order to measure the thickness of matter removed in the course of each rectification operation, I provide a micrometric abutment device which permits of accurately determining the position into which support can be brought back, by pivoting about journals 9, when it is desired to perform a rectification operation. This micrometric device consists, for instance of a screw 23 carried by support 4 and capable of bearing, through its point, against a plane surface $10_1$ of plate 10, said screw being controlled through a motion reducing system 24, 25 operated by means of a milled knob 26 movable in front of a graduated scale, the divisions of which correspond, for instance, to hundredths of millimeters.

Concerning now the mechanisms for driving the grinding wheel 3, they are made in such manner that said wheel can, on the one hand, be driven in rotation and, on the other hand, be moved parallelly to its own axis, as far as a constant end position for a given adjustment of the machine as above explained.

Such a mechanism is given by way of example on the drawings.

In this embodiment, wheel 3 is fixed to the end of a wheel carrying piece 27 (for instance through a cone assembly) journalled on a support 28 and rotated through a pulley 29 itself slidably mounted on the ribbed end $27_1$ of said piece 27.

Support 28 is mounted in such manner that it can slide on a plate 30, parallelly to the axis of the wheel. Adjusting means, consisting for instance of the combination of a screw 31 and a nut 32, are provided for moving said support at will with respect to plate 30 which is itself slidably mounted, in the same direction, on the frame 5 of the machine.

In order to control the displacements of the whole of the plate 30 and the wheel carrier 27, against the action of return spring 33, I provide a kinematic system of any suitable kind, consisting for instance of a circular cam 34 coacting, through its side, with a finger 35, provided with a roller, carried by plate 30, said cam 34 being rigid with a drum 36 keyed on a shaft 37 itself rotated, through the intermediate of a helical wheel 38 and an endless screw 39, by a driving shaft 40 which carries a driving pulley 41.

Advantageously, pulley 41 cooperates with the driving shaft 40 through the intermediate of a clutch system 42 which permits of uncoupling these two elements by acting upon a lever 43 against the action of a spring 44. In this case, shaft 40 can be manually driven by means of a crank 45.

Finally, concerning the system for dressing the grinding wheel 3, it is devised, as above explained, in such manner as to permit of maintaining the profile of said wheel by removal of matter in a direction perpendicular to that of its axis.

For this purpose, this system is, for instance, carried by the support 28 of the wheel carrier 27.

This system includes, as shown by the diagram of Fig. 1, tools, for instance diamonds 46 and 47, respectively carried by the tool carrying pieces 48 and 49, which are given movements such that the points of said diamonds move along straight lines making an angle $\alpha$ with each other and always intersecting each other in a plane $P_1$, whatever be the amplitude of the forward movement of the whole of said tool carrying pieces with respect to the grinding wheel which is to be reshaped.

A dressing device complying with these conditions is illustrated, by way of example, by Figs. 6 and 7 of the drawings.

In this embodiment, the tool carrying pieces 48 and 49 are mounted in the form of slides cooperating with slideways 50 and 51 (making with each other an angle equal to $\alpha$) provided in a kind of small table 52, pivoted about an axis 53, on a carriage 54 capable of being moved, with respect to a base 54', by means of a micrometric screw 55. This screw is operated through a milled knob 55' in a direction perpendicular to the axis of wheel 3, the pivoting of table 52 about its axis 53 permitting to move the dressing tools away from said wheel 3.

I provide a control system capable of producing conjugated displacements of the tool carrying pieces 48 and 49. This control system may be constituted, for instance, by a connecting rod 56 articulated about an axis 57 on table 52 and provided with a control handle 58 which acts on said connecting rod through the intermediate of an eccentric lug 59 capable of coacting with an elongated eye 60 provided in the body of the connecting rod, the latter being fitted with fingers 61 and 62 engaging in notches 63 and 64 provided respectively in slides 48 and 49.

Finally, I arrange the structure in such manner that base 54' can be displaced, with respect to frame 5, in a direction parallel to the axis of grinding wheel 3, for instance by means of an adjustment screw 65, so that it is possible to bring the point of intersection of the paths of tools 46 and 47 into plane $P_1$ along which the portions $A_1$ and $B_1$ of wheel 3 intersect.

With such an arrangement, rectification of the inner walls of chamber 1 is effected in the following manner:

First of all, on the support 4, placed in the suitable direction, a false gun is fitted, and the operator ascertains whether the forward movement of grinding wheel 3 is such that it causes points O and $O_1$ to coincide (see the diagram of Fig. 1). If this is not the case, the position of support 28 is adjusted in order to obtain this result, by means of screw 31. Also, in the course of this operation, the operator checks the profile of wheel 3. If the latter is to be reshaped, the position of support 54 is correspondingly adjusted, by means of screw 65. The forward stroke and the profile of the grinding wheel having been checked and adjusted, the false gun is replaced by a gun to be rectified and a rectification operation is effected. Support 4 is then pivoted and the operator ascertains, by means of the plug, whether the desired result is obtained.

If necessary, the support is brought back into its working position and a new rectification operation is performed after having adjusted micrometric screw 23 in such manner that wheel 3 again attacks the walls of chamber 1 to the desired degree. Finally, from time to time, the operator will check up the profile of wheel 3 by means of the false gun and, if necessary, he will dress said wheel, after having adjusted the forward displacement of the tool carrying carriage 54 by means of micrometric screw 55.

Anyway, whatever be the particular embodiment that is chosen, the device according to the present invention has, among others, the important advantage of permitting rectification operations which are both rapid and accurate.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. A machine for rectifying surfaces of revolution, which comprises, in combination, a grinding wheel having the form of a body of revolution about an axis and having at least two surfaces the generatrices of which are arranged at an angle to one another and which meet along a line located in a plane perpendicular to said axis, a support for the piece including corresponding surfaces of revolution to be rectified, a holder for said grinding wheel, means for rotating said holder about the axis of said wheel, means for moving said holder axially between two constant predetermined positions with respect to the support for the piece in one of which said grinding wheel engages the piece, whereby said grinding wheel always reaches the same extreme positions with respect to said support in the axial direction, and means fixed with respect to the support for the piece for reshaping said grinding wheel between two grinding operations thereof in the other of said positions, said means including means arranged to remove such amounts of matter from said surfaces of said wheel that the meeting line of said surfaces of the wheel is always located in the same line with respect to said holder.

2. A machine for rectifying the inner wall of a chamber having the form of two coaxial conical surfaces of different angularity meeting along a line located in a plane perpendicular to their axes, which comprises, in combination, a grinding wheel the outer surface of which is constituted by a cylindrical surface and a conical surface coaxial therewith, said last surfaces meeting along a line located in a plane perpendicular to the cylinder axis, the angle between two corresponding generatrices of said cylindrical and conical surfaces being equal to the angle to be formed between two corresponding generatrices of the said conical surfaces of said chamber, a support for the piece in which said chamber to be rectified is located, a holder for said grinding wheel, means for rotating said holder about an axis coinciding with the axis of said wheel and making with the axis of said chamber an angle equal to one-half of the apex angle of the conical surface of said chamber which is engageable by the cylindrical surface of said wheel, means for moving said holder axially between two constant predetermined positions with respect to the support for the piece in one of which said grinding wheel engages the piece, whereby said grinding wheel always reaches the same extreme positions with respect to said support in the axial direction, and means fixed with respect to the support for the piece for reshaping said grinding wheel between two grinding operations thereof in the other of said positions, said means including means arranged to remove such amounts of matter from said surfaces of said wheel that the meeting line of said surfaces of the wheel is always located in the same line with respect to said holder.

3. In a machine as claimed in claim 1, said matter removing means including removing members one for each of said surfaces, and means guiding said members for movement in paths always intersecting in the same plane, and means for returning said grinding member to a predetermined position with respect to said plane.

4. A method of rectifying an area composed of at least two surfaces of revolution having their generatrices at an angle to one another and meeting along a line located in a plane perpendicular to the axis of revolution, comprising rotating a piece containing such area about an axis, rotating a grinding wheel having corresponding surfaces of revolution about an axis, moving said grinding wheel into engagement with said piece to a constant predetermined position with respect to said piece in the axial direction thereof, withdrawing said grinding wheel from such position in the axial direction thereof to a second constant predetermined position, reshaping the surface of said grinding wheel when in said second position to preserve the angle between the generatrices of the surfaces thereof constant and to preserve the meeting line of the surfaces in the same plane relative to said second position.

5. A method of rectifying the inner wall of a chamber in the form of two coaxial conical surfaces, by means of a grinding wheel, comprising inserting the grinding wheel within a model having the desired profile, thereby checking the correctness of the profile of the grinding wheel, moving such grinding wheel into the chamber to a constant predetermined position with respect to said piece in the axial direction thereof, simultaneously rotating the piece containing the chamber and the grinding wheel, thereby grinding and rectifying the surface of the chamber, removing the grinding wheel from the chamber to a second constant predetermined position, inserting within the chamber a marked plug to check the dimensions of the chamber, reshaping the grinding wheel when in said second position by removing matter from the wheel so as to maintain the angle between its conical surfaces constant and to preserve the meeting line of the surfaces in the same plane relative to said second position.

6. A machine for rectifying the inner wall of a chamber having the form of two coaxial conical surfaces of different angularity meeting along a line located in a plane perpendicular to their axes, which comprises, in combination, a grinding wheel the outer surface of which is constituted by a cylindrical surface and a conical surface coaxial therewith, said last surfaces meeting along a line located in a plane perpendicular to the cylinder axis, the angle between two corresponding generatrices of said cylindrical and conical surfaces being equal to the angle to be formed between two corresponding generatrices of the said conical surfaces of said chamber, a support for the piece in which said chamber to be rectified is located, a holder for said grinding wheel, means for rotating said holder about an axis coinciding with the axis of said wheel and making with the axis of said chamber an angle equal to one-half of the apex angle of the conical surface of said chamber which is engageable by the cylindrical surface of said wheel, and means for moving said holder axially up to a constant predetermined position with respect to the support for the piece, whereby said grinding wheel always reaches the same extreme position with respect to said support in the axial direction.

7. A machine according to claim 6, including means for producing a constant displacement of the grinding wheel in the axial direction.

MARC BIRKIGT.